(12) United States Patent
Murphy

(10) Patent No.: US 7,611,784 B2
(45) Date of Patent: Nov. 3, 2009

(54) INTEGRATED SWITCHING ASSEMBLIES FOR A FUEL CELL STACK

(75) Inventor: Michael W Murphy, Manchester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 724 days.

(21) Appl. No.: 10/863,015

(22) Filed: Jun. 8, 2004

(65) Prior Publication Data

US 2005/0271906 A1    Dec. 8, 2005

(51) Int. Cl.
*H01M 8/04* (2006.01)
*H01H 9/00* (2006.01)

(52) U.S. Cl. .............................. 429/12; 429/23; 200/238

(58) Field of Classification Search ................... 429/12, 429/23; 200/238
See application file for complete search history.

(56) References Cited

U.S. PATENT DOCUMENTS

| | | |
|---|---|---|
| 6,541,147 B1 | 4/2003 | McLean et al. |
| 6,677,066 B1 | 1/2004 | Jansen et al. ................... 429/7 |
| 6,828,053 B2 * | 12/2004 | Fly et al. ....................... 429/32 |
| 2005/0202297 A1 | 9/2005 | Schmitz et al. ............... 429/32 |
| 2005/0270806 A1 * | 12/2005 | Zhu ............................. 363/17 |

FOREIGN PATENT DOCUMENTS

| | | |
|---|---|---|
| DE | 198 27 880 | 12/1999 |
| DE | 19827880 | * 12/1999 |
| DE | 100 10 985 | 9/2001 |
| DE | 102 17 034 | 10/2003 |

* cited by examiner

*Primary Examiner*—Mark Ruthkosky
*Assistant Examiner*—Karie O'Neill
(74) *Attorney, Agent, or Firm*—Harness, Dickey & Pierce, P.L.C.

(57) ABSTRACT

A switch assembly for selectively enabling current flow through a segment of a fuel cell stack. The switch assembly includes a first plate including a first non-conductive substrate having a first conductive path therethrough and a second plate including a second non-conductive substrate having a second conductive path therethrough. A first switch is disposed between the first plate and the second plate and is in electrical communication with the first conductive path and the second conductive path. The first switch is operable in an open mode to prohibit current flow between the first conductive path and the second conductive path. The first switch is operable in a closed mode to enable current flow between the first conductive path and the second conductive path.

9 Claims, 4 Drawing Sheets

INTEGRATED SWITCHING ASSEMBLIES FOR A FUEL CELL STACK

FIELD OF THE INVENTION

The present invention relates to fuel cell stacks, and more particularly to an integrated short isolation circuit for a fuel cell stack.

BACKGROUND OF THE INVENTION

Fuel cell systems are increasingly being used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a polymer electrolyte membrane (PEM) that is sandwiched between an anode and a cathode. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

Fuel cell stack durability is traditionally defined in terms of the number of hours the fuel cell stack can maintain each of its fuel cells above a given voltage threshold for a required current draw. Because the fuel cells of the fuel cell stack are connected in series, an individual fuel cell voltage cannot be affected without affecting the voltage of every other fuel cell in the fuel cell stack. Furthermore, because only one anode and one cathode gas stream is fed to the entire fuel cell stack, the composition, flow rate, stoichiometry, pressure and humidification of the gas streams are also not individualized for each fuel cell in the fuel cell stack. Therefore, there are traditionally no options for independently affecting individual fuel cell voltages of the assembled fuel cell stack.

SUMMARY OF THE INVENTION

Accordingly, the present invention provides a switch assembly for selectively enabling current flow through a segment of a fuel cell stack. The switch assembly includes a first plate including a first non-conductive substrate having a first conductive path therethrough and a second plate including a second non-conductive substrate having a second conductive path therethrough. A first switch is disposed between the first plate and the second plate and is in electrical communication with the first conductive path and the second conductive path. The first switch is operable in an open mode to prohibit current flow between the first conductive path and the second conductive path. The first switch is operable in a closed mode to enable current flow between the first conductive path and the second conductive path.

In one feature, the first switch is an electrically operated switch.

In another feature, the first plate further includes a conductive pad that enables electrical communication between the first conductive path and an adjacent segment of the fuel cell stack.

In another feature, the second plate further includes a conductive pad that enables electrical communication between the second conductive path and an adjacent segment of the fuel cell stack.

In another feature, the switch assembly further includes a third conductive path through the first plate and a fourth conductive path through the second plate. A second switch is disposed between the first plate and the second plate and is in electrical communication with the third conductive path and the fourth conductive path. The second switch is operable in an open mode to prohibit current flow between the third conductive path and the fourth conductive path. The second switch is operable in a closed mode to enable current flow between the third conductive path and the fourth conductive path.

In still another feature, the first and second switches are electrically operated switches.

In yet another feature, the first and second switches are independently operated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
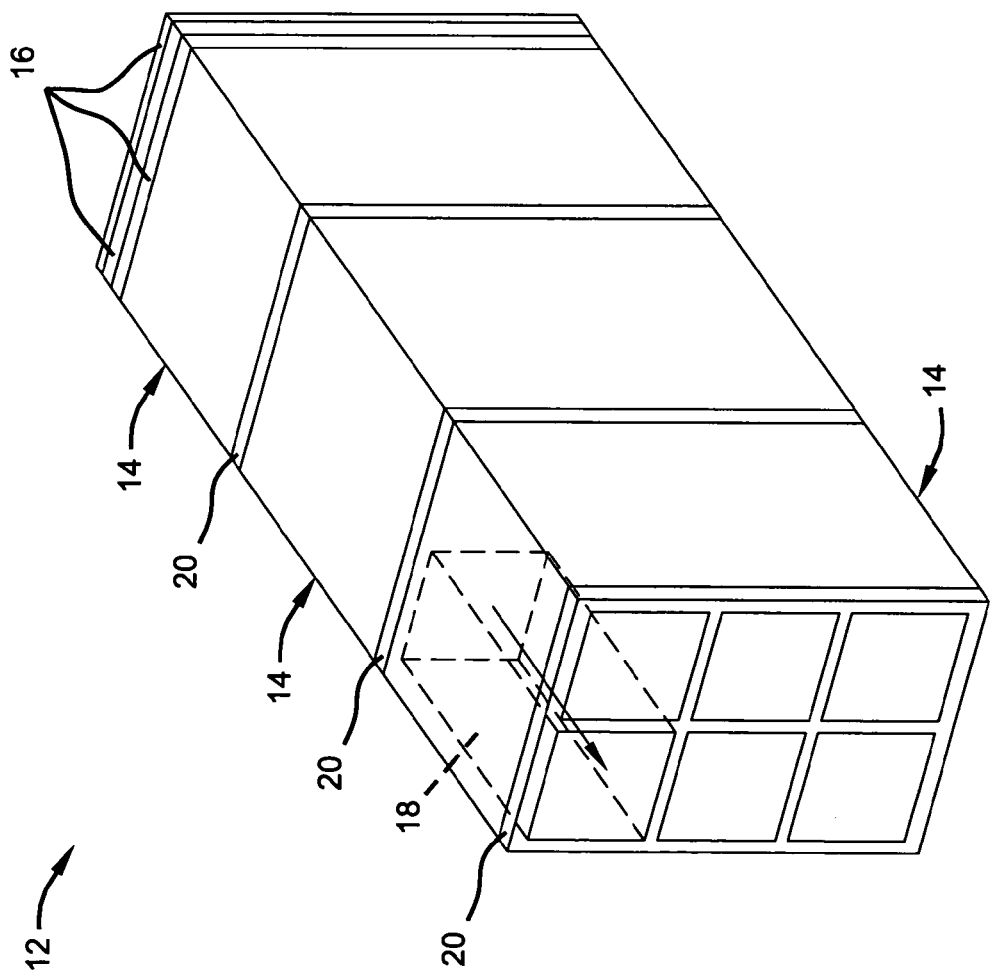
FIG. 1 is a perspective view of a fuel cell stack that includes integrated switching assemblies according to the present invention.

Referring now to FIG. 1, a fuel cell stack 12 is illustrated. The fuel cell stack 12 includes a series of fuel cell blocks 14. The fuel cell blocks 14 each include a series of fuel cells 16 that are divided into fuel cell segments 18, as discussed in further detail below. Integrated switching assemblies 20 divide the fuel cell blocks 14. Each fuel cell segment 18 is considered a sub-stack. Each fuel cell segment 18 is selectively connected in electrical series with corresponding fuel cell segments 18 of adjacent fuel cell blocks 14 using the integrated switching assemblies 20. The exemplary fuel cell stack 12 of FIG. 1 includes thirty fuel cells 16 divided into three fuel cell blocks 14 by three integrated switching assemblies 20. Each fuel cell block 14 includes six fuel cell segments 18. Thus, the exemplary fuel cell stack 12 provides eighteen fuel cell segments 18 or sub-stacks that are electrically independent from one another.

Figure 2:
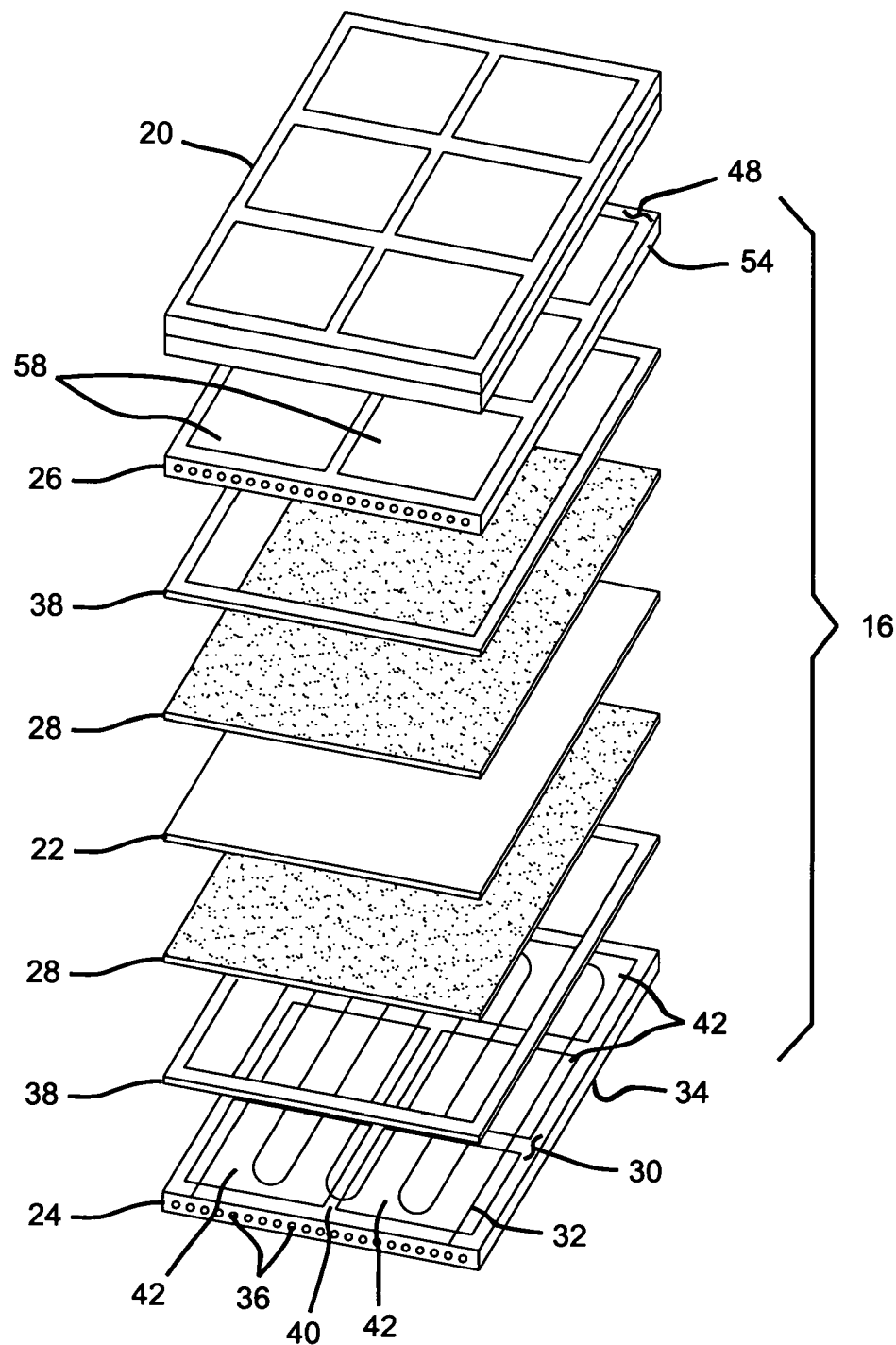
FIG. 2 is an exploded view of a portion of the fuel cell stack detailing components of an integrated switching assembly.
Figure 4:
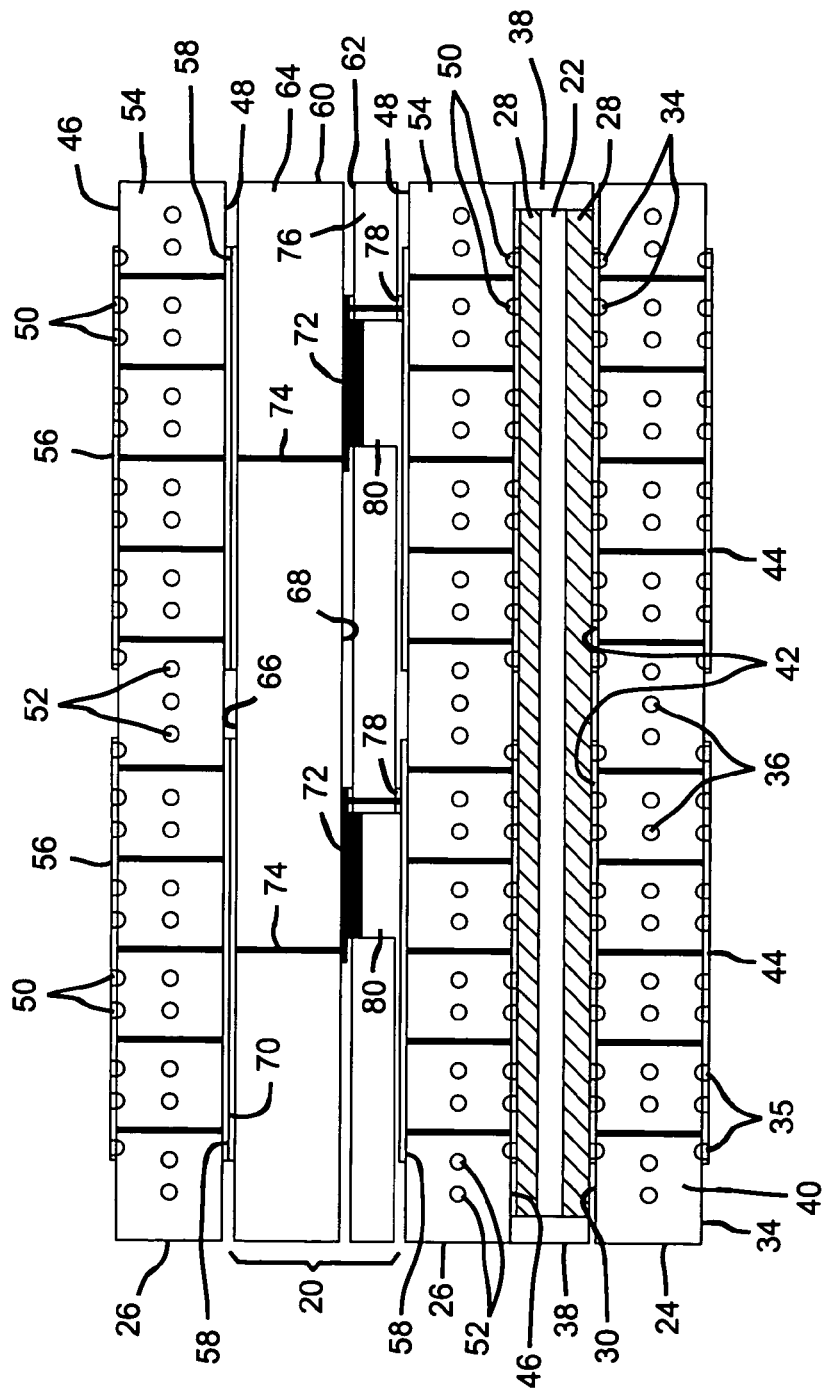
FIG. 4 is a cross-section of the combined integrated switching assembly.

Referring now to FIGS. 2 and 4, a fuel cell 16 is illustrated and includes a membrane electrode assembly (MEA) 22 sandwiched between a bipolar plate 24 and a modified bipolar plate 26. Diffusion media 28 are included and are disposed between the MEA 22 and the bipolar plates 24,26. An integrated switching assembly 20 separates the fuel cell 16 from an adjacent fuel cell 16 (not shown).

The bipolar plate 24 includes a first reactant side 30 having reactant flow channels 32 formed therein and a second reactant side 34 having reactant flow channels 35 formed therein. A reactant (i.e., hydrogen or oxygen) flows through the reactant flow channels 32 across the first reactant side 30 and is diffused through the diffusion media 28 for reaction across the MEA 22. Another reactant (i.e., the other of hydrogen or oxygen) flows through the reactant flow channels across the second reactant side 34 and is diffused through adjacent diffusion media 28 (not shown) for reaction across an adjacent MEA 22 (not shown). A series of coolant flow channels 36 are formed through the bipolar plate 24 and facilitate coolant flow therethrough to regulate a temperature of the fuel cell stack 12. A gasket 38 is disposed between the bipolar plate 24 and the MEA 22 to seal the fluid flow through the diffusion media 28.

The bipolar plate 24 includes a non-conductive substrate 40 having series of conductive pads 42 disposed on the first reactant side 30 and a series of conductive pads 44 disposed on the second reactant side 34. The conductive pads 42 on the first reactant side 30 are in electrical communication with the conductive pads 44 on the second reactant side 34 through the non-conductive substrate 40. In this manner, the bipolar plate 24 is electrically segmented to enable current flow from a conductive pad 42 on the first reactant side 30 to a corresponding conductive pad 44 on the second reactant side 34. Although the exemplary bipolar plate 24 of FIG. 2 illustrates a six segment bipolar plate 24, it is appreciated that the bipolar plate 24 can include more or fewer segments.

The modified bipolar plate 26 includes a reactant side 46 and a collector side 48. The reactant side 46 includes reactant flow channels 50 formed therein. A reactant (i.e., hydrogen or oxygen) flows through the reactant flow channels 50 across the reactant side 46 and is diffused through the diffusion media 28 for reaction across the MEA 22. A series of coolant flow channels 52 are formed through the modified bipolar plate 26 and facilitate coolant flow therethrough to regulate a temperature of the fuel cell stack 12. A gasket 38 is disposed between the modified bipolar plate 26 and the MEA 22 to seal the fluid flow through the diffusion media 28.

The modified bipolar plate 26 includes a non-conductive substrate 54 having series of conductive pads 56 disposed on the reactant side 46 and a series of conductive pads 58 disposed on the collector side 48. The conductive pads 56 on the reactant side 46 are in electrical communication with the conductive pads 58 on the collector side 48 through the non-conductive substrate 54. In this manner, the modified bipolar plate 26 is electrically segmented to enable current flow from a conductive pad 56 on the reactant side 46 to a corresponding conductive pad 58 on the collector side 48. It is appreciated that the bipolar plate 24 and the modified bipolar plate 26 include the same number of segments (e.g., six segments).

Figure 3:
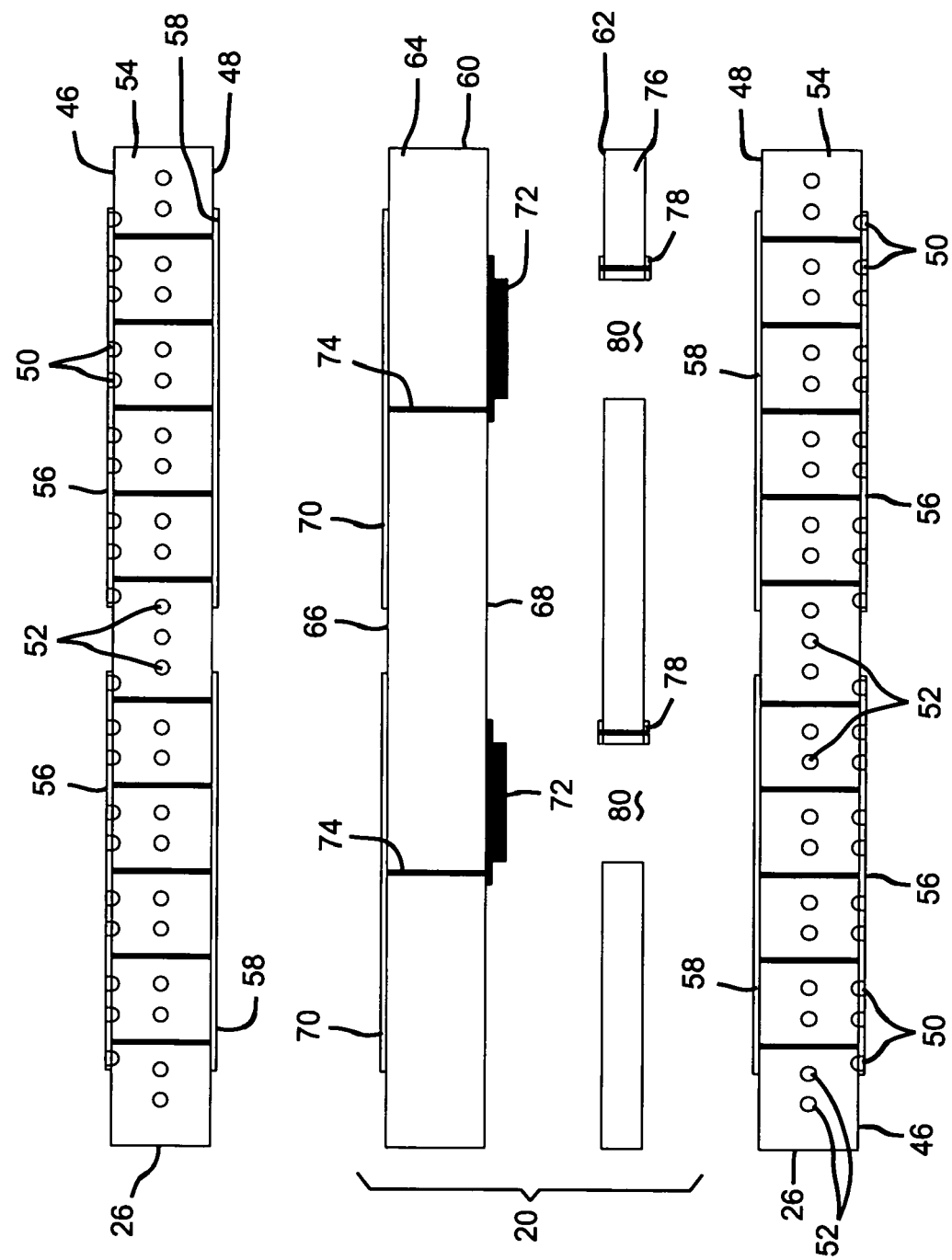
FIG. 3 is an exploded cross-section of the integrated switching assembly.

Referring now to FIGS. 3 and 4, the integrated switching assembly 20 is disposed between a set of modified bipolar plates 26. The integrated switching assembly 20 includes a switch plate 60 and a spacer plate 62. The switch plate 60 includes a non-conductive substrate 64 having a concentrator side 66 and a switch side 68. The concentrator side 66 includes a series of conductive pads 70 that are adjacent to the conductive pads 58 of the collector side 48 of the modified bipolar plate 26.

The switch side 68 includes a series of integrated switches 72 associated with each conductive pad 70. The switches 72 are electrically operated switches that have a low physical profile, high current carrying capacity and ultra-low resistance. In one embodiment switches 72 may be implemented as an extremely conductive semiconductor switch which can be actuated using a relatively small voltage signal. In this embodiment, the semiconductor switch may be implemented external of or internal to the fuel cell stack. A control circuitry is utilized to generate the relatively small voltage signal in response to a low cell voltage. In an alternate embodiment, switches 72 may take the form a diode which changes from a conductive state to a non-conductive state at a given voltage. In this alternate embodiment, the diode functions as a switch in that it is turned on and off at a predetermined or threshold voltage, thereby eliminating the need for further control circuitry to actuate the switch. Thus, the diode implemented switch represents an embodiment in which the switches are internal to the fuel cell stack.

The switches 72 are in electrical communication with the conductive pads 70 through the non-conductive substrate 64. In one embodiment, a via 74 associated with each switch 72 enables electrical communication between the corresponding conductive pad 70 and the switch 72. Printed wire leads (not shown) can be integrated into the non-conductive substrate 64. The printed wire leads go to an edge of the switch plate 60 to enable switch signals to be communicated to the individual switches 72. In this manner, each switch 72 can be remotely actuated between open and closed positions by a controller (not shown).

The spacer plate 62 includes a non-conductive substrate 76 having current paths 78 and pockets 80 formed therein. The pockets 80 provide seat space for the switches 72 of the switch plate 60. The current paths 78 enable electrical communication between the switches 72 and the conductive pads 58 of the adjacent modified bipolar plate 26.

With particular reference to FIG. 4, operation of the fuel cell stack 12 will be described in detail. In operation, reaction of the hydrogen and oxygen across the MEA 22 generates current. The current flows through the conductive pads 44 on the reactant side of the modified bipolar plate to the conductive pads on the collector side. The current selectively flows through the integrated switching assembly 20 to the modified bipolar plate 26 on the other side of the integrated switching assembly 20. More specifically, if a switch 72 is in the closed position, current flow is enabled through the corresponding segment 18. If a switch 72 is in the open position, current flow is prohibited through the corresponding segment 18.

By implementing the integrated switching assemblies 20, individual segments of the fuel cell stack 12 can be switched out. In this manner, regions of the MEA's can be electrically isolated to raise the voltage of a low performing fuel cell 16 of the fuel cell stack 12. As a result, regions of the fuel cell stack 12 that are hindering overall fuel cell stack performance can be electrically removed from the fuel cell stack 12, thereby improving the performance of the fuel cell groups 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A switch assembly for selectively enabling current flow through a segment of a fuel cell stack, comprising:

a fuel cell stack including:
- a first bipolar plate including a first non-conductive substrate having a first conductive path extending therethrough and that is in electrical communication with a first segment of said fuel cell stack;
- a second bipolar plate including a second non-conductive substrate having a second conductive path extending therethrough and that is in electrical communication with a second segment of said fuel cell stack; and
- a first switch operably disposed between said first bipolar plate and said second bipolar plate and in electrical communication with said first conductive path and said second conductive path;
- wherein said first switch in an open mode prohibits current flow between said first conductive path and said second conductive path and in a closed mode enables current flow between said first conductive path and said second conductive path.

2. The switch assembly of claim 1 wherein said first switch is an electrically operated switch.

3. The switch assembly of claim 1 wherein said first switch is a diode operated in response to a cell voltage.

4. The switch assembly of claim 1 wherein said first bipolar plate further comprises a conductive pad that provides electrical continuity between said first conductive path and said first segment of said fuel cell stack.

5. The switch assembly of claim 1 wherein said second bipolar plate further comprises a conductive pad that provides electrical continuity between said second conductive path and said second segment of said fuel cell stack.

6. The switch assembly of claim 1 further comprising:
- a third conductive path through said first bipolar plate and that is in electrical communication with a third segment of said fuel cell stack;
- a fourth conductive path through said second bipolar plate and that is in electrical communication with a fourth segment of said fuel cell stack; and
- a second switch disposed between said first bipolar plate and said second bipolar plate and in electrical communication with said third conductive path and said fourth conductive path;
- wherein said second switch in an open mode prohibits current flow between said third conductive path and said fourth conductive path and in a closed mode enables current flow between said third conductive path and said fourth conductive path.

7. The switch assembly of claim 6 wherein said first and second switches are electrically operated switches.

8. The switch assembly of claim 6 wherein said first and second switches are diodes operated in response to a cell voltage.

9. The switch assembly of claim 6 wherein said first and second switches are independently operated.

* * * * *